United States Patent
Kawagishi et al.

(10) Patent No.: US 8,204,534 B2
(45) Date of Patent: Jun. 19, 2012

(54) TRANSMIT POWER CONTROL SYSTEM, TRANSMIT POWER CONTROL METHOD, AND TERMINAL DEVICE

(75) Inventors: Takeshi Kawagishi, Kawasaki (JP); Kanji Hozumi, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 65 days.

(21) Appl. No.: 12/724,982

(22) Filed: Mar. 16, 2010

(65) Prior Publication Data
US 2010/0173666 A1    Jul. 8, 2010

Related U.S. Application Data

(63) Continuation of application No. PCT/JP2007/068574, filed on Sep. 25, 2007.

(51) Int. Cl.
*H04B 7/005* (2006.01)

(52) U.S. Cl. ....... 455/522; 455/69; 455/101; 455/245.1; 370/332

(58) Field of Classification Search .......... 455/522, 455/69, 277.2, 140, 132, 296, 436, 561, 101, 455/233.1, 245.1, 453; 370/342, 480, 331, 370/320, 329, 332; 375/347, 316, 346, 353, 375/299, 267; 343/702, 876, 703
See application file for complete search history.

(56) References Cited

U.S. PATENT DOCUMENTS

| | | | |
|---|---|---|---|
| 5,574,983 A | 11/1996 | Douzono et al. | |
| 7,024,168 B1 | 4/2006 | Gustafsson et al. | |
| 7,391,831 B2 * | 6/2008 | Lim | 375/347 |
| 7,454,181 B2 | 11/2008 | Banister et al. | |
| 7,734,269 B2 * | 6/2010 | Komulainen et al. | 455/277.2 |
| 2002/0082036 A1 * | 6/2002 | Ida et al. | 455/522 |
| 2006/0068831 A1 * | 3/2006 | Stewart et al. | 455/522 |
| 2008/0057995 A1 * | 3/2008 | Komulainen et al. | 455/522 |
| 2008/0111748 A1 * | 5/2008 | Dunn et al. | 343/702 |
| 2008/0220819 A1 * | 9/2008 | Ben-Eli | 455/561 |
| 2008/0259893 A1 * | 10/2008 | Murata et al. | 370/342 |

FOREIGN PATENT DOCUMENTS

| | | |
|---|---|---|
| EP | 1422839 | 5/2004 |
| JP | 07107033 | 4/1995 |
| JP | 2001359145 | 12/2001 |
| JP | 2002198900 | 7/2002 |
| JP | 2003504957 | 2/2003 |
| JP | 2003069493 | 3/2003 |
| JP | 2004040553 | 2/2004 |
| JP | 2006254093 | 9/2006 |
| JP | 2006324816 | 11/2006 |
| JP | 2007527674 | 9/2007 |
| WO | 0105088 A1 | 1/2001 |

(Continued)

OTHER PUBLICATIONS

Written Opinion of the ISA PCT/JP2007/068574 dated Apr. 15, 2010.

(Continued)

*Primary Examiner* — Tan Trinh
(74) *Attorney, Agent, or Firm* — Murphy & King, P.C.

(57) ABSTRACT

A system of controlling transmit power of a base station where a terminal device having a receive diversity function is wirelessly connected includes a power information generation part to generate transmit power control information that corresponds to variation in reception characteristics of the terminal device when a receive diversity state is switched; and a transmit power control part to control transmit power of a downstream signal based on the transmit power control information.

16 Claims, 12 Drawing Sheets

FOREIGN PATENT DOCUMENTS

WO 2005088864 A1 9/2005

OTHER PUBLICATIONS

International Search Report dated Mar. 11, 2008 in corresponding International Application No. PCT/JP2007/068574.

Written Opinion of the ISA PCT/JP2007/068574 dated Mar. 11, 2008.

Notification of Reason for Refusal dated Apr. 17, 2012 issued in corresponding Japanese Patent Application No. 2009-534075.

* cited by examiner

TRANSMIT POWER CONTROL SYSTEM, TRANSMIT POWER CONTROL METHOD, AND TERMINAL DEVICE

CROSS-REFERENCE TO RELATED APPLICATIONS

This application is a continuation of International Application No. PCT/JP2007/068574, filed on Sep. 25, 2007, now pending, herein incorporated by reference.

FIELD

The embodiments discussed herein are related to power control corresponding to variation of a receive gain due to a switch-over of receive diversity that is used for a wireless terminal device of a W-CDMA (Wideband-Code Division Multiple Access) system, for example, to a transmit power control system, a transmit power control method and a terminal device which control transmit signal power of a base station in response to a switch-over of receive diversity.

BACKGROUND

Receive diversity is used as the technique for realizing improvement of quality of communication service and expansion of the network capacity. This receive diversity has a plurality of reception systems, and can improve the S/N ratio of a receive signal by properly processing a signal after demodulation.

In a wireless terminal device having a function of this receive diversity, the following receive diversity control can be performed. That is, for the purpose of power saving, the control is performed that the receive diversity function is switched between on and off as necessary. Using the property of having a plurality of reception systems, during communication by one branch, signal strength measurement is performed by the other branch in a frequency different from the former branch by switching receive diversity off.

Concerning such receive diversity, Japanese Laid-open Patent Publication No. 2006-324816 discloses that the object thereof is to decrease power consumption in a diversity receiver, and a condition decision circuit which decides whether specified conditions are met or not and a control circuit which temporarily stops diversity reception when the condition decision circuit judges that the specified conditions are met are included (Abstract, FIG. 1, etc.).

A wireless terminal device having a receive diversity function of W-CDMA will be described with reference to FIG. 1. This wireless terminal device 100 includes a transmit and receive antenna 102 and a receive antenna 104. A first reception system 106 and a transmission system 108 are constructed in the transmit and receive antenna 102, and a second reception system 110 is constructed in the receive antenna 104.

A transmit signal of a base station, that is, a downstream signal is received by the transmit and receive antenna 102 and the receive antenna 104. The received signal of the transmit and receive antenna 102 passes through a radio frequency-automatic gain control (RF-AGC) part 112, a cell detection-path detection part 114 and an inverse spreading-synchronous detection part 116, and amplification, cell detection, path detection, inverse spreading and synchronous detection are performed on the received signal thereof. The received signal is then added to a RAKE combination part 120 through a receive diversity (RxDiv) switch-over part 118. Similarly, the received signal of the receive antenna 104 passes through a RF-AGC part 122, a cell detection-path detection part 124 and an inverse spreading-synchronous detection part 126, and amplification, cell detection, path detection, inverse spreading and synchronous detection are performed on the received signal thereof. The received signal is then added to the RAKE combination part 120 through the RxDiv switch-over part 118.

When the receive diversity function is made to operate, the RxDiv switch-over part 118 allows the received signals of both of the first reception system 106 and the second reception system 110 to pass therethrough and to be RAKE-combined. When the receive diversity function is stopped, the received signal of the first reception system 106 only is added to the RAKE combination part 120.

For the RAKE-combined signal, SIR (Signal to Interference Ratio) determination is performed in an SIR determination-TPC (Transmit Power control) bit generation part 128. Thereby, a TPC bit pattern is generated. In a decoding-CRC decision part 130, a code is decoded from the received signal, and CRC (Cyclic Redundancy Check) decision is performed. A transmission data generation part 132 generates transmission data. A TPC bit pattern is added to a bit field along with another transmission data bit pattern, and transmitted from the transmission system 108 through the transmit and receive antenna 102 to a base station.

In communication between the wireless terminal device 100 having such a receive diversity function and a base station not depicted, FIG. 2 depicts a transmit and receive sequence when receive diversity is switched from an operating state (ON) to a stopped state (OFF), and FIG. 3 depicts a transmit and receive sequence when receive diversity is switched from a stopped state (OFF) to an operating state (ON). In FIG. 2, $T_1$ is the period when RxDiv is ON and $T_2$ is the period when RxDiv is OFF. In FIG. 3, $T_3$ is the period when RxDiv is OFF and $T_4$ is the period when RxDiv is ON.

In FIGS. 2 and 3, A is the downstream signal transmitted from a base station and B is an upstream signal transmitted from the wireless terminal device 100. The downstream signal includes a chain of continuous slots SLs and the upstream signal includes TPC bit fields. As described above, in the wireless terminal device 100, SIR measurement is performed for every received slot SL, and TPC bit setting is performed for each TPC bit field in the upstream signal. Thus, power control in response to variation of a communication state such as fading is executed.

When such receive diversity is switched from ON to OFF (FIG. 2), reception characteristics rapidly vary at a slot SLx just after the switching, and reduction of a receive gain and rapid power degradation arise. In this case, there is a possibility that demodulation errors increase and reception quality extremely deteriorates for a certain time.

When the receive diversity is switched from OFF to ON (FIG. 3), reception characteristics rapidly vary at a slot SLy just after the switching. In this case, a receive gain is enhanced and quality of service gets excessive for a certain time. In this case, there is a possibility that transmit power at the base station that is a resource of a network is excessively consumed, and vain power is consumed.

Concerning such problems, there is no suggestion or disclosure thereof in Japanese Laid-open Patent Publication No. 2006-324816, and no disclosure about solving means thereof is presented.

SUMMARY

According to an aspect of the embodiments of the present invention, a system of controlling transmit power of a base station where a terminal device having a receive diversity function is wirelessly connected includes a power information generation part to generate transmit power control information that corresponds to variation in reception characteristics of the terminal device when a receive diversity state is switched; and a transmit power control part to control transmit power of a downstream signal based on the transmit power control information.

According to another aspect of the embodiments of the present invention, a method of controlling transmit power of a base station where a terminal device having a receive diversity function is wirelessly connected includes generating transmit power control information to suppress variation in reception characteristics of the terminal device when a receive diversity state is switched; and controlling transmit power of a downstream signal based on the transmit power control information.

According to another aspect of the embodiments of the present invention, a terminal device to be wirelessly connected to a base station and to have a receive diversity function includes a power information generation part to generate transmit power control information that suppresses variation in transmit power of a downstream signal in a case of switch-over of a receive diversity state, which is generated in the terminal device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

Other objects, features and advantages of the embodiments discussed herein become clearer by referring to the attached drawings and each of the embodiments.

DESCRIPTION OF EMBODIMENTS

According to one aspect of the embodiments, in order to avoid rapid variation in reception characteristics arising when receive diversity of a terminal device is switched from an operating state to a stopped state, or from a stopped state to an operating state, transmit power control information corresponding to the variation in reception characteristics is generated. Transmission power of a downstream signal of a base station is controlled based on this transmit power control information, deterioration of communication characteristics is prevented, and excessive power consumption is reduced.

First Embodiment

Figure 1:
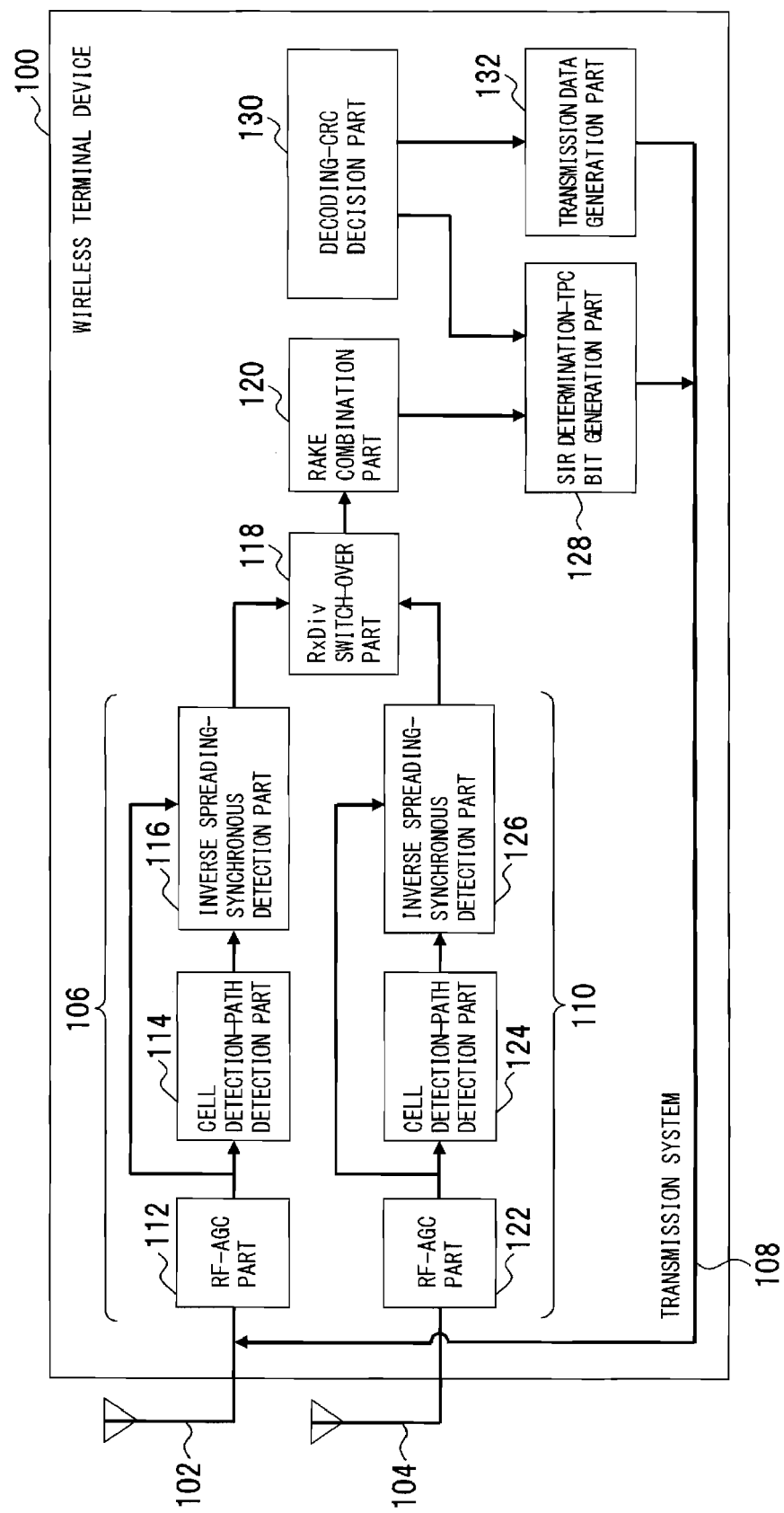
FIG. 1 depicts a wireless terminal device having a receive diversity function.
Figure 2:
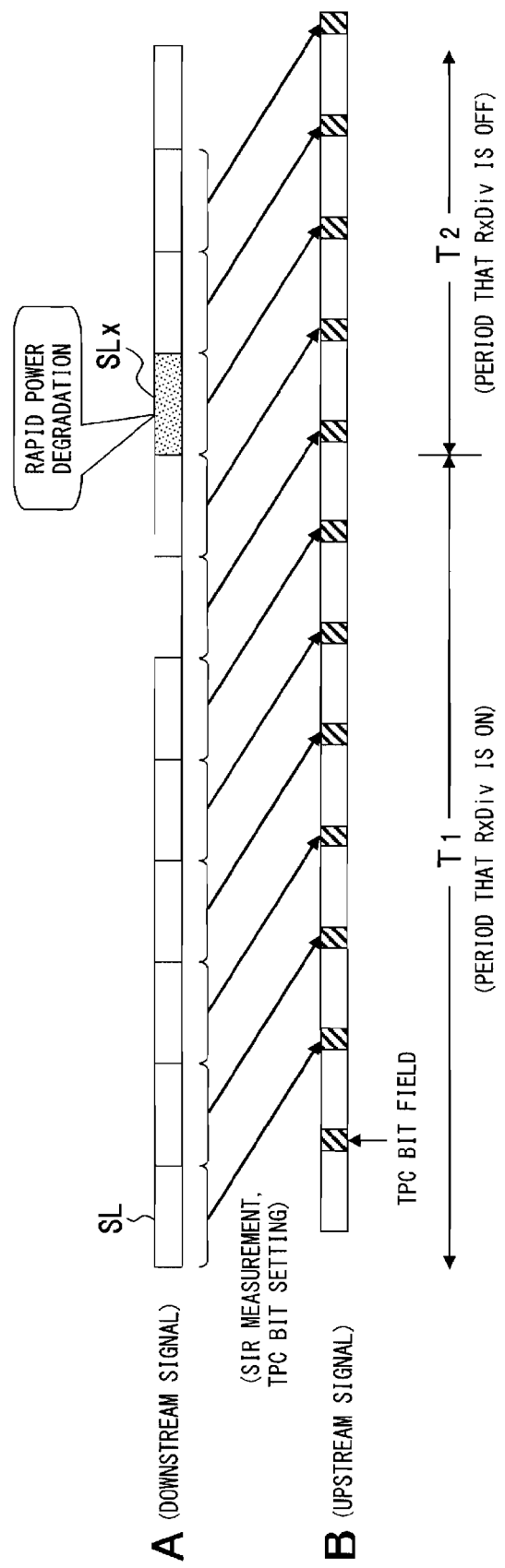
FIG. 2 is a diagram for explaining variation of reception characteristics due to the switch-over of receive diversity (from ON to OFF)
Figure 3:
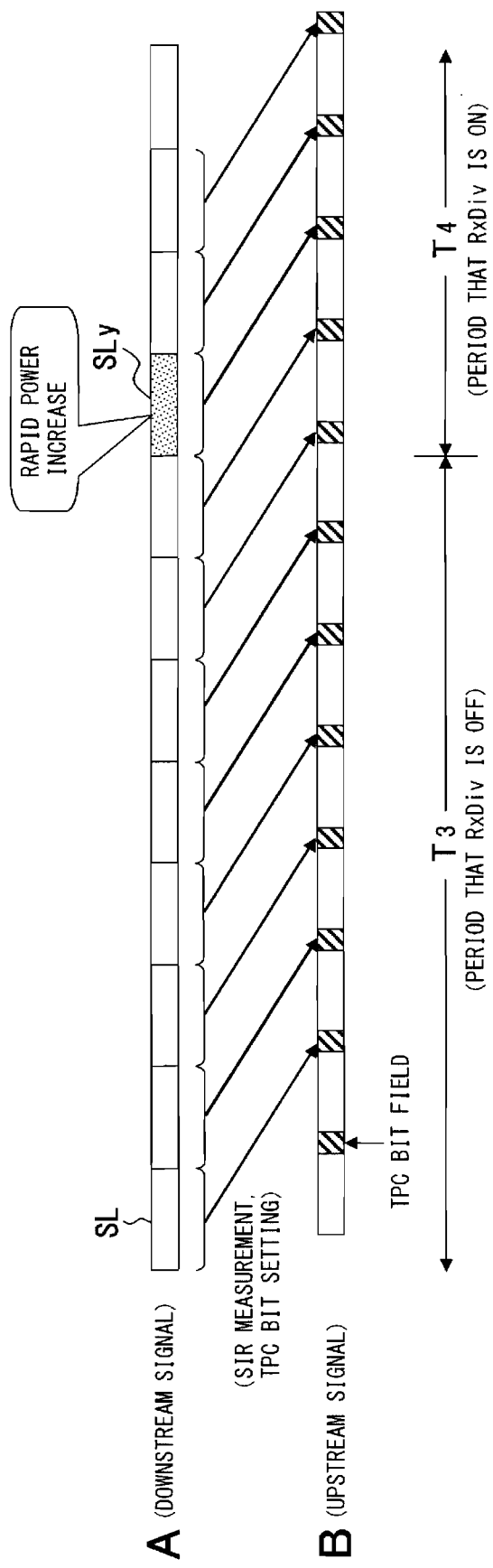
FIG. 3 is a diagram for explaining variation of reception characteristics due to the switch-over of receive diversity (from OFF to ON)
Figure 4:
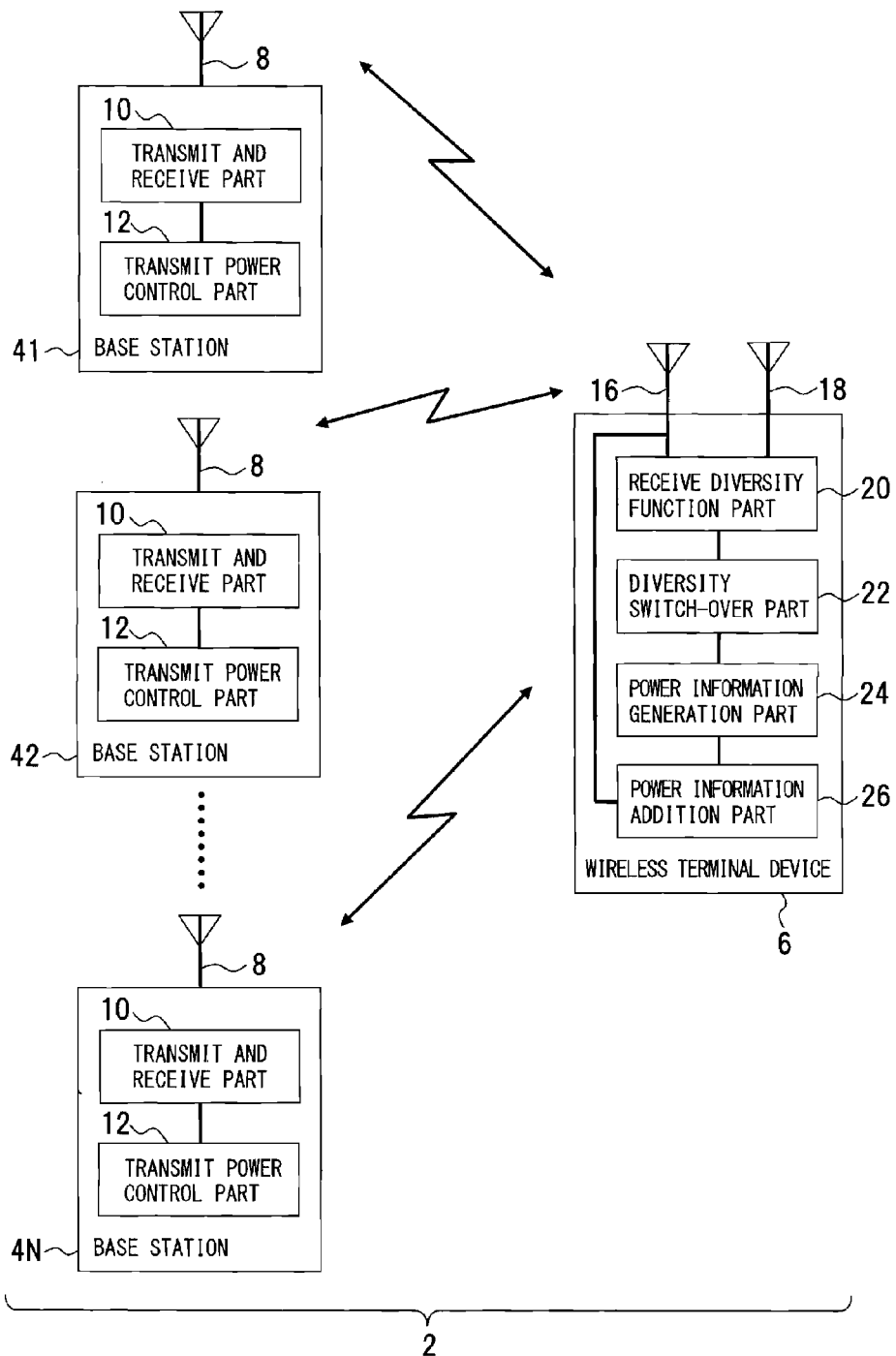
FIG. 4 depicts a transmit power control system according to a first embodiment.

A first embodiment will now be described with reference to FIG. 4. FIG. 4 depicts a transmit power control system of a base station by a wireless terminal device.

This transmit power control system 2 is the system of controlling transmit power of a transmission signal of a base station 4, for example, a downstream signal based on whether receive diversity of a wireless terminal device 6 (hereinafter, "terminal device 6"), which is able to be wirelessly connected to a plurality of base stations 41, 42, . . . 4N (hereinafter, simply "base station 4" if a certain base station is designated), is ON or OFF.

For each of the base stations 41, 42 . . . 4N, an antenna 8, a transmit and receive part 10 and TPC (Transmit Power Control) part 12 are provided. The base stations 41, 42 . . . 4N transmit a downstream signal to the terminal device 6 and receives an upstream signal transmitted from the terminal device 6.

The TPC part 12 is a transmit power control part that refers to power control information superimposed on an upstream signal received from the terminal device 6, and controls transmit power of the downstream signal. For this TPC part 12, a transmit power control (TPC) function which is one of W-CDMA arts can be used. Since, in W-CDMA, a TPC bit pattern is present in a format of transmission slots (fifteen slots=one Frame and one Frame=ten ms) of an uplink DPCCH (Dedicated Physical Common Control Channel), which is control information, the base station 4 determines whether down transmit power is made to be UP or DOWN in the TPC part 12 by the contents of the TPC bit pattern transmitted from the terminal device 6, and controls transmit power.

The terminal device 6 includes a transmit and receive antenna 16, a receive antenna 18, a receive diversity function part 20, a diversity switch-over part 22, a power information generation part 24 and a power information addition part 26. In receive diversity, both of the transmit and receive antenna 16 and the receive antenna 18 are used. When receive diversity is not used, only the transmit and receive antenna 16 is used because of individual reception. The transmit and receive antenna 16 is used for both reception of a downstream signal and transmission of an upstream signal.

The receive diversity function part 20 is a part RAKE-combining received signals with using both of the transmit and receive antenna 16 and the receive antenna 18. The diversity switch-over part 22 is a switch-over part switching receive diversity to an operating state or a stopped state. The operating state of receive diversity means reception using both the transmit and receive antenna 16 and the receive antenna 18. The stopped state of receive diversity means reception using the transmit and receive antenna 16 by itself. Selection of diversity reception reduces the influence of fading to improve reception characteristics.

The power information generation part 24 is a part reacting to the switch-over of the receive diversity, and generating power information in response to rapid variation in reception characteristics. The power information addition part 26 is a part adding a TPC bit pattern to an upstream signal as power control information. The upstream signal having the added TPC bit field is transmitted via the transmit and receive antenna 16 to the base station 4.

For determining a TPC bit pattern in the terminal device 6, a downstream signal of the base station 4 is used. That is, the downstream signal is measured in the terminal device 6 by the slot, and Signal to Interference Ratio (SIR) thereof is calculated. Both inner loop transmit power control and outer loop transmit power control may be used for transmit power control. In inner loop transmit power control, the calculated SIR value is compared with a Target SIR value instructed from the base station 4. If the calculated SIR value is lower than the Target SIR value, the setting that transmit power is made to be UP is performed. If the value is higher than the Target SIR value, the setting that transmit power is made to be DOWN is performed. Thus, control of down transmit power is performed. According to the 3GPP (3rd Generation Partnership Project) standard, power control steps by the slot are four, that is, 0.5, 1, 1.5 and 2 [dB].

In outer loop transmit power control, reception characteristics are calculated for a long time interval of some degrees while Block Error Rate (BLER) obtained from a result of error detection by a cyclic redundancy code (CRC: Cyclic Redundancy Check) is compared with Target BLER. The cyclic code is obtained by encoding data, on which synchronous detection and combination are performed in the terminal device 6, from the base station 4. If the characteristics deteriorate, the Target SIR value itself may be changed.

In this transmit power control system 2, control of down transmit power of the base station 4 is performed by reacting to the switch-over of the receive diversity of the terminal device 6 and by using the above described transmit power control function.

(1) When Receive Diversity is Switched from ON to OFF

During operation of the terminal device 6, if the reception of the transmit and receive antenna 16 and the receive antenna 18 is switched to that of the transmit and receive antenna 16 alone, the number of antennas for reception is reduced, and thus, a receive gain is rapidly reduced at the terminal device 6 in response to the reduction to make the power of a received signal degradation. Therefore, the setting is continuously performed that the power to TPC bit patterns is made to be UP by a slot just before the receive diversity is switched to OFF in response to a power value corresponding to predicted power degradation. Such power control can prevent lowering the reception quality at the terminal device 6 side.

(2) When Receive Diversity is Switched from OFF to ON

During the operation, if the reception state of the transmit and receive antenna 16 alone is switched to that of the transmit and receive antenna 16 and the receive antenna 18, the number of antennas increases, and thus, the receive gain of the terminal device 6 is rapidly enhanced in response to the increase to make the power of a received signal strong. Therefore, the value of the down transmit power from the base station 4 is lowered to an appropriate value (that is, a value just about not due to excessive quality) as soon as possible since the receive diversity was switched ON. In this case, the setting of DOWN of transmit power is continuously performed for TPC bit patterns to make the down transmit power degradation.

According to such structure, the transmit power of the downstream signal of the base station 4 is controlled to an optimum value by using power control information (TPC bit pattern) transmitted from the terminal device 6 in accordance with the switch-over of receive diversity, reception quality does not get excessive, and reduction of power consumption can be achieved without lowering the reception quality.

Figure 5:
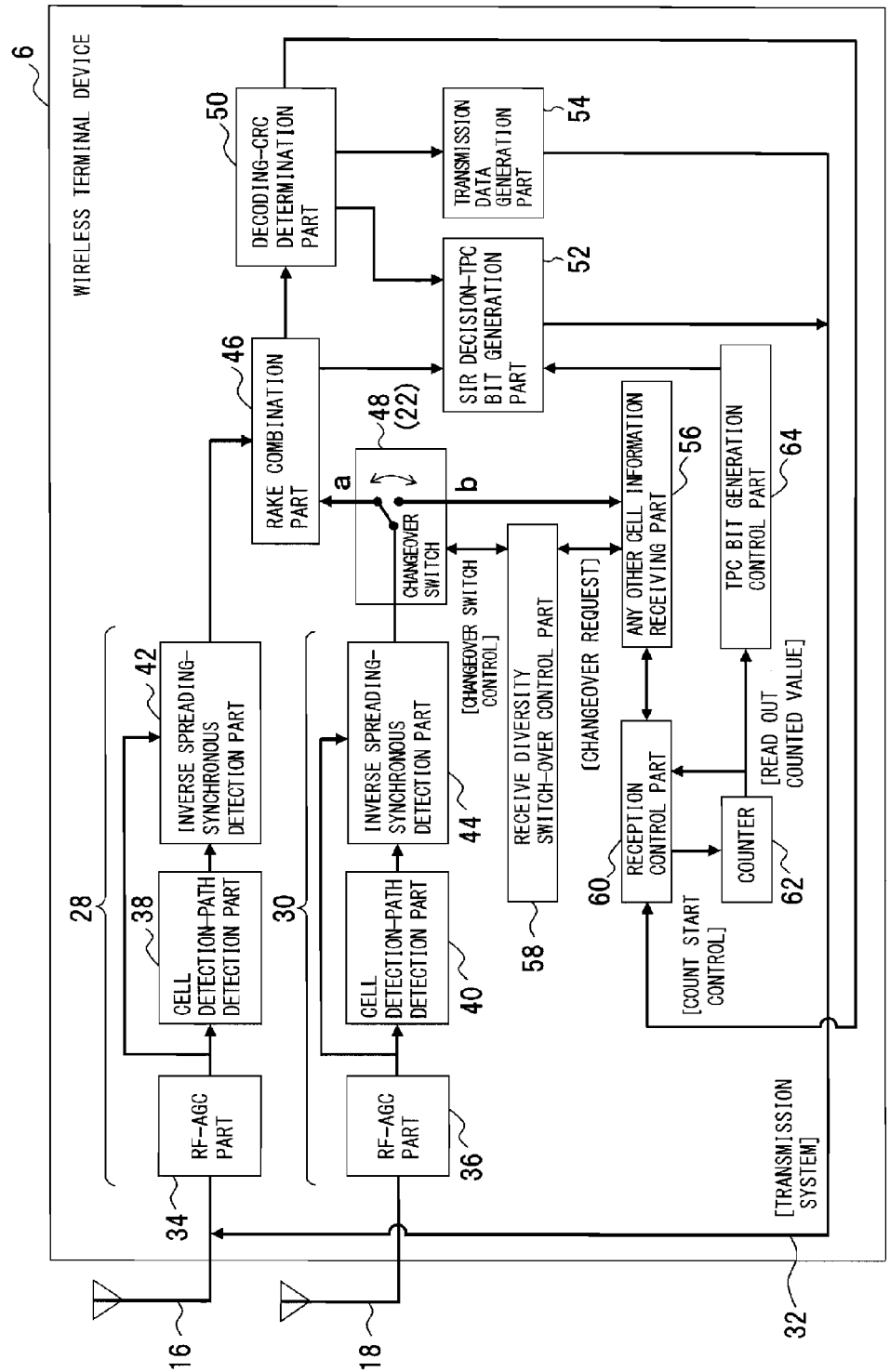
FIG. 5 depicts an example of configuration of a wireless terminal device.

The terminal device 6 will now be described with reference to FIG. 5. FIG. 5 depicts the first embodiment of a terminal device. In FIG. 5, the same components as described in FIG. 4 are denoted by the same reference numerals.

This terminal device 6 includes a first reception system 28 and a second reception system 30 as a plurality of reception systems and, for example, a transmission system 32 as a single transmission system. The transmit and receive antenna 16 is disposed at the first reception system 28 and the transmission system 32 as a first antenna, and the receive antenna 18 is disposed at the second reception system 30 as a second antenna. Diversity reception by the transmit and receive antenna 16 and the receive antenna 18 can be performed, and individual antenna reception by either the transmit and receive antenna 16 or the receive antenna 18 can be performed.

A radio frequency-automatic gain control (RF-AGC) part 34 amplifies a wireless signal received by the transmit and receive antenna 16, and controls the received signal at a certain level. A RF-AGC part 36 amplifies a wireless signal received by the receive antenna 18, and controls the received signal at a certain level similarly.

A cell detection-path detection part 38 detects a cell that function as a carrier for making a call with the base station 4, and detects a path thereof. A cell detection-path detection part 40 detects a cell that functions as a carrier for making a call with the base station 4, and detects a path thereof similarly.

An inverse spreading-synchronous detection part 42 generates a spreading code that synchronizes with a sending code, executes synchronous detection with using a received carrier wave to detect a received signal. An inverse spreading-synchronous detection part 44 executes the same processes.

A RAKE combination part 46 is a signal combination part in a case of diversity reception. The RAKE combination part 46 receives a received signal from the first reception system 28 and a received signal from the second reception system 30, combines received signals which are distributed and/or delayed, and executes a process of path diversity reception for reducing fading. In this case, the received signal from the second reception system 30 is added to the RAKE combination part 46 via a changeover switch 48 as a switching part in diversity reception. That is, the receive diversity function part 20 (FIG. 4) is constituted of the first reception system 28, the second reception system 30 and the RAKE combination part 46.

A decoding-CRC (Cyclic Redundancy Check) decision part 50 decodes a sending code from the combination signal obtained by the RAKE combination part 46, and executes error decision of a code by the above described CRC decision.

An SIR determination-TPC bit generation part 52 executes the above described SIR determination in response to the combination received signal obtained by the RAKE combination part 46 and an output from the decoding-CRC decision part 50, and generates a TPC bit pattern representing power control information for the base station 4. A transmission data generation part 54 generates transmission data based on the output from the decoding-CRC decision part 50. The TPC bit pattern generated by the SIR determination-TPC bit generation part 52 is superimposed on this transmission data. This transmission data is transmitted from the transmission system 32 via the transmit and receive antenna 16 to the base station 4.

The changeover switch 48 which is intervened between the second reception system 30 and the RAKE combination part 46 is one example of the diversity switch-over part 22. The changeover switch 48 is a diversity switch-over part for whether or not to be diversity reception, and is a signal selection part. In a case of diversity reception, the received signal of the second reception system 30 is added to the RAKE combination part 46. In a case of not diversity reception, the received signal of the second reception system 30 for the RAKE combination part 46 is intercepted. That is, in the case of diversity reception, the received signal of the second reception system 30 is switched to "a" side (diversity reception), and in the case of not diversity reception, the received signal of the second reception system 30 is switched to "b" side (individual antenna reception).

Any other cell information receiving part 56 receives the received signal from the second reception system 30 via the changeover switch 48 in a case of individual antenna reception, obtains cell information acquired by the cell detection-path detection part 40, and outputs a changeover request.

A receive diversity switch-over control part 58 is a control part of the changeover switch 48. The receive diversity switch-over control part 58 receives the changeover request of the any other cell information receiving part 56, and switches the changeover switch 48 to either "a" side or "b" side.

A reception control part 60 receives receive diversity switch-over information from the decoding-CRC decision part 50 as control information, receives an output from the any other cell information receiving part 56, executes reception control as to whether to be diversity reception or individual antenna reception, and outputs a count start control signal of a counter 62 from a time point before a predetermined time of the switch-over of receive diversity.

The counter 62 receives the count start control signal from the reception control part 60, and counts the number of slots of a downstream signal. This counted value read out from the counter 62 (=the number of slots) is added to the reception control part 60, and a TPC bit generation control part 64.

The TPC bit generation control part 64 is a control part of the SIR determination-TPC bit generation part 52, and makes the SIR determination-TPC bit generation part 52 generate a TPC bit pattern, which is transmit power control information, in accordance with the counted value of the counter 62. That is, the power information generation part 24 (FIG. 4) is constituted of the TPC bit generation control part 64 and the SIR determination-TPC bit generation part 52, and a TPC bit pattern is transmitted from the SIR determination-TPC bit generation part 52 to the transmission system 32. The power information addition part 26 (FIG. 4) is constituted of the SIR determination-TPC bit generation part 52 and the transmission system 32.

In the terminal device 6 like the above, a signal from the base station 4, inputted from the transmit and receive antenna 16 and the receive antenna 18 is made to pass through the RF-AGC parts 34 and 36, cell detection-path detection are executed by the cell detection and path detection parts 38 and 40, and inverse spreading and synchronous detection are executed by the inverse spreading-synchronous detection parts 42 and 44. After that, RAKE combination is executed by the RAKE combination part 46 in accordance with a receive diversity state.

If receive diversity (RxDiv) is OFF (RxDiv=OFF), only a first system is RAKE-combined. That is, only the first reception system 28 is RAKE-combined. If receive diversity (RxDiv) is ON (RxDiv=ON), received signals of both of the first reception system 28 and the second reception system 30 are RAKE-combined.

For the RAKE-combined signals, SIR determination is executed by the SIR determination-TPC bit generation part 52, and thereby a TPC bit pattern is determined to generate a TPC bit pattern. Transmission to the base station 4 is executed with mounting the TPC bit pattern on a bit field along with another transmission data bit pattern. The setting of the TPC bit pattern is changed as follows in accordance with a receive diversity state.

In this embodiment, a power step by the slot is defined as 1 [dB]. The invention is not limited thereto.

(1) When Receive Diversity is from ON to OFF

Since approximately 3 [dB] of power degradation from the slot after changeover is forecasted, control is performed so as to be +3 [dB] at the changeover. That is, in view of a period getting 3 [dB] by the increase of a step of 1 [dB] ($T_1$=three slots in FIG. 9) and a period where a value set in a TPC bit pattern is valid in downstream data transmitted from the base station 4 ($T_2$=three slots in FIG. 9), conventional TPC control is stopped before six slots, and control is executed so that +1 [dB] is set in the period of three slots continuously. In this case, after 3 [dB] of power steps are increased, the TPC control is returned to normal one. While the period $T_2$ is defined as three slots in the present 3GPP standard, a longer period than three slots may be set. A period can be increased and decreased, and the length of a period is option.

(2) When Receive Diversity is from OFF to ON

Since approximately 3 [dB] of power increase from the slot after changeover is forecasted, control is performed so as to be −3 [dB] at the changeover. That is, in view of a period $T_3$ getting −3 [dB] by the decrease of a step of 1 [dB] (=three slots) and a period $T_4$ where a value set in a TPC bit pattern is valid in downstream data transmitted from the base station 4 (=three slots), conventional TPC control is stopped before six slots, and control is executed so that −1 [dB] is set in the period of three slots continuously. In this case, after 3 [dB] of power steps are decreased, the TPC control is returned to normal one. While the period $T_4$ is defined as three slots in the present 3GPP standard, a longer period than three slots may be set. A period can be increased and decreased, and the length of a period is option.

Figure 6:
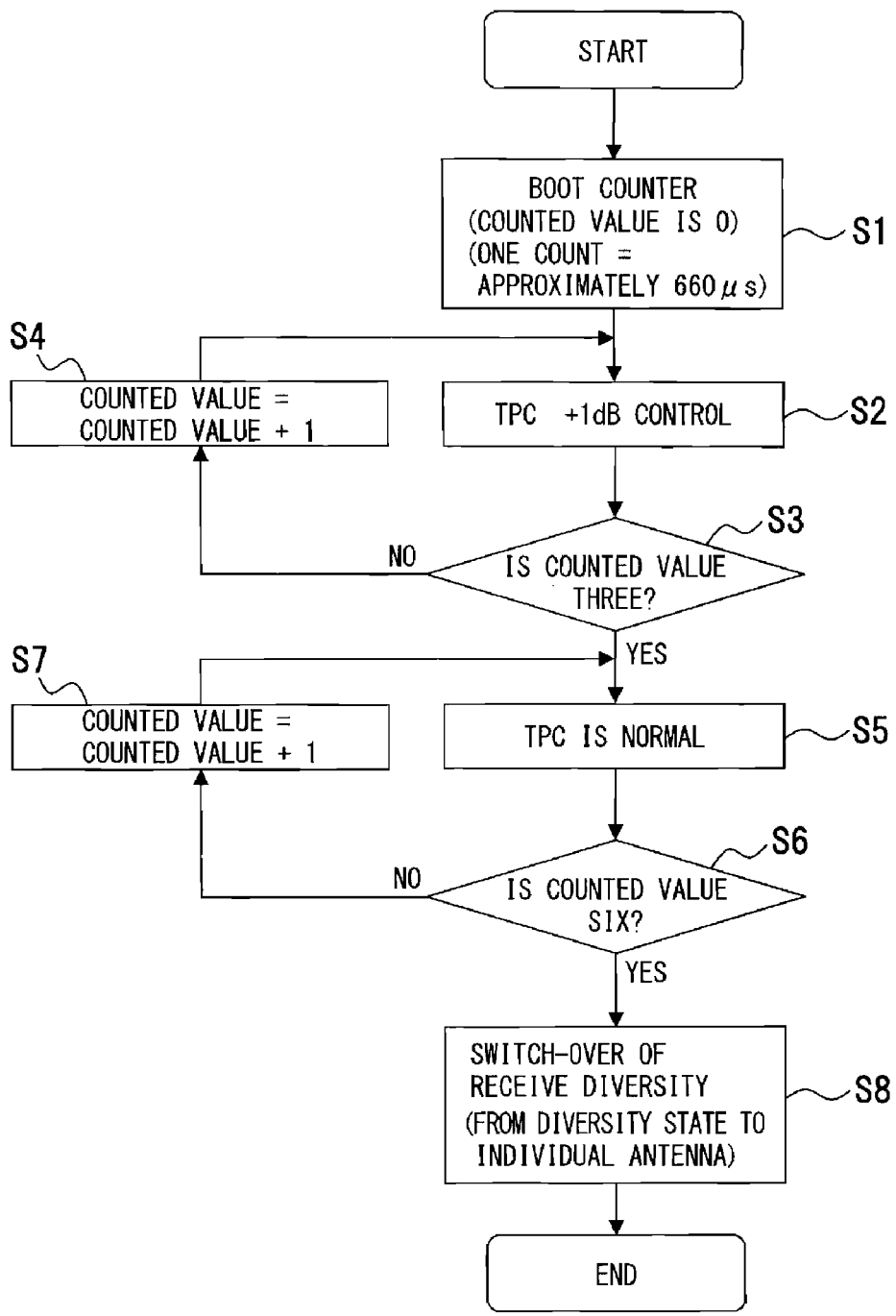
FIG. 6 is a flowchart depicting processing procedure when receive diversity is switched from an operating state to a stopped state.
Figure 7:
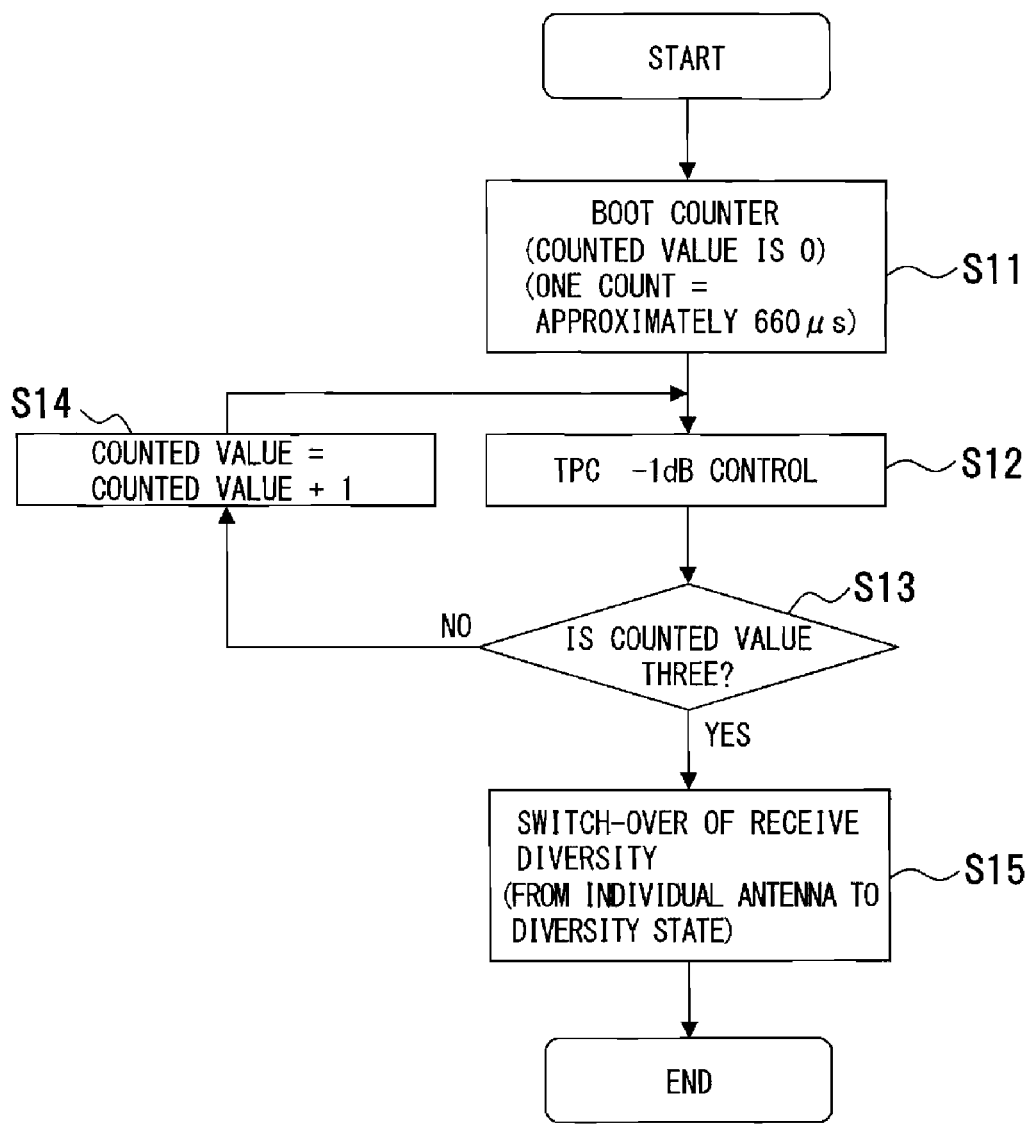
FIG. 7 is a flowchart depicting processing procedure when receive diversity is switched from a stopped state to an operating state.

TPC control and switch-over control of receive diversity will now be described with reference to FIGS. 6 and 7. FIG. 6 is a flowchart when a receive diversity state is switched to individual antenna reception, and FIG. 7 is a flowchart when individual antenna reception is switched to a receive diversity state.

When a receive diversity state is switched to individual antenna reception, if there is the delay of the certain number of slots, for example, three slots from an upstream signal in a timing of a reflection of TPC information to a downstream signal, and, if power is increased by 1 [dB] per one slot, there needs the delay of any other three slots for executing predetermined power increase, for example, 3 [dB]. As a result, after waiting for a predetermined delay time, for example, six slots passing, switch-over from a receive diversity state to individual antenna reception is executed.

In this processing procedure, as depicted in FIG. 6, a counted value of the counter 62 is set in 0, and the counter 62 is booted (step S1). A reset and a boot of the counter 62 are linked with a switch-over timing of receive diversity, and a count is started before a predetermined time from the switch-over. For example, one count is approximately 660 [μs] that represents a slot SL.

When the counter 62 is booted, +1 [dB] control is executed for a current TPC pattern (step S2), and it is determined whether the counted value of the counter 62 is three (step S3). If the counted value is not three (NO of step S3), the current counted value of the counter 62 is made to be increment (counted value=counted value+1) (step S4), and the procedure returns to step S2.

In step S3, if the counted value is three (YES of step S3), TPC is normal control (step S5), and it is determined whether the counted value of the counter 62 is six (step S6). If the counted value is not six (NO of step S6), the current counted value of the counter 62 is made to be increment (counted value=counted value+1) (step S7), and the procedure returns to step S5.

In step S6, if the counted value is six (YES of step S6), the switch-over of the receptive diversity is performed, the diversity state is switched to individual antenna reception (step S8), and the procedure is ended.

In such processing procedure, if gain reduction of, for example, 3 [dB] occurs when receive diversity is switched to individual antenna reception, the control that power is increased before a predetermined time of the switch-over timing from the receive diversity to the individual antenna reception, that is, from sixth slot is executed incrementally for three slots continuously. Since a control result thereof is executed from third slots of the switch-over timing to the switch-over timing, the gain reduction occurring at the switch-over timing is supplemented by increasing power. As a result, inconvenience such as connection interruption due to rapid variation in the reception characteristics can be avoided to achieve stabilization of communication characteristics.

In the processing procedure of the switch-over from the individual antenna reception to the receive diversity state, a receive gain is enhanced differently in the case of the switch-over from the receive diversity state to the individual antenna reception. Thus, before increase of transmit power of a downstream signal, the switch-over from the individual antenna reception to the receive diversity state is executed. That is, if there is the delay of the certain number of slots, for example, three slots from an upstream signal in a timing of a reflection of TPC information to a downstream signal, and, if power is reduced by 1 [dB] per one slot, the switch-over from the individual antenna reception to the receive diversity state is executed after waiting for a predetermined delay time, for example, three slots passing in order to execute predetermined power reduction, for example, the power reduction of 3 [dB]. Since a receive gain is high in the receive diversity state, inconvenience such as disconnection does not occur although the power reduction of a downstream signal is delayed.

In this processing procedure, as depicted in FIG. 7, a counted value of the counter 62 is set in 0, and the counter 62 is booted (step S11). When the counter 62 is booted, −1 [dB] control is executed for a current TPC pattern (step S12), and it is determined whether the counted value of the counter 62 is three (step S13). If the counted value is not three (NO of step S13), the current counted value of the counter 62 is made to be increment (counted value=counted value+1) (step S14), and the procedure returns to step S12.

In step S13, if the counted value is three (YES of step S13), the switch-over of the receive diversity is performed. The individual antenna reception is switched to diversity state (step S15), and the procedure is ended.

In such processing procedure, if gain enhancement of, for example, 3 [dB] occurs when individual antenna reception is switched to receive diversity, the control that power is lowered before a predetermined time of the switch-over timing from the individual antenna reception to the receive diversity, that is, from third slot is executed incrementally for three slots continuously, and the individual antenna reception is switched to the receive diversity. Thus, gain enhancement occurring at the switch-over timing can be supplemented by reducing transmit power. As a result, exceeding reception quality and vain power consumption due to rapid variation in the reception characteristics can be lowered and reduced to achieve stabilization of communication characteristics.

Figure 8:
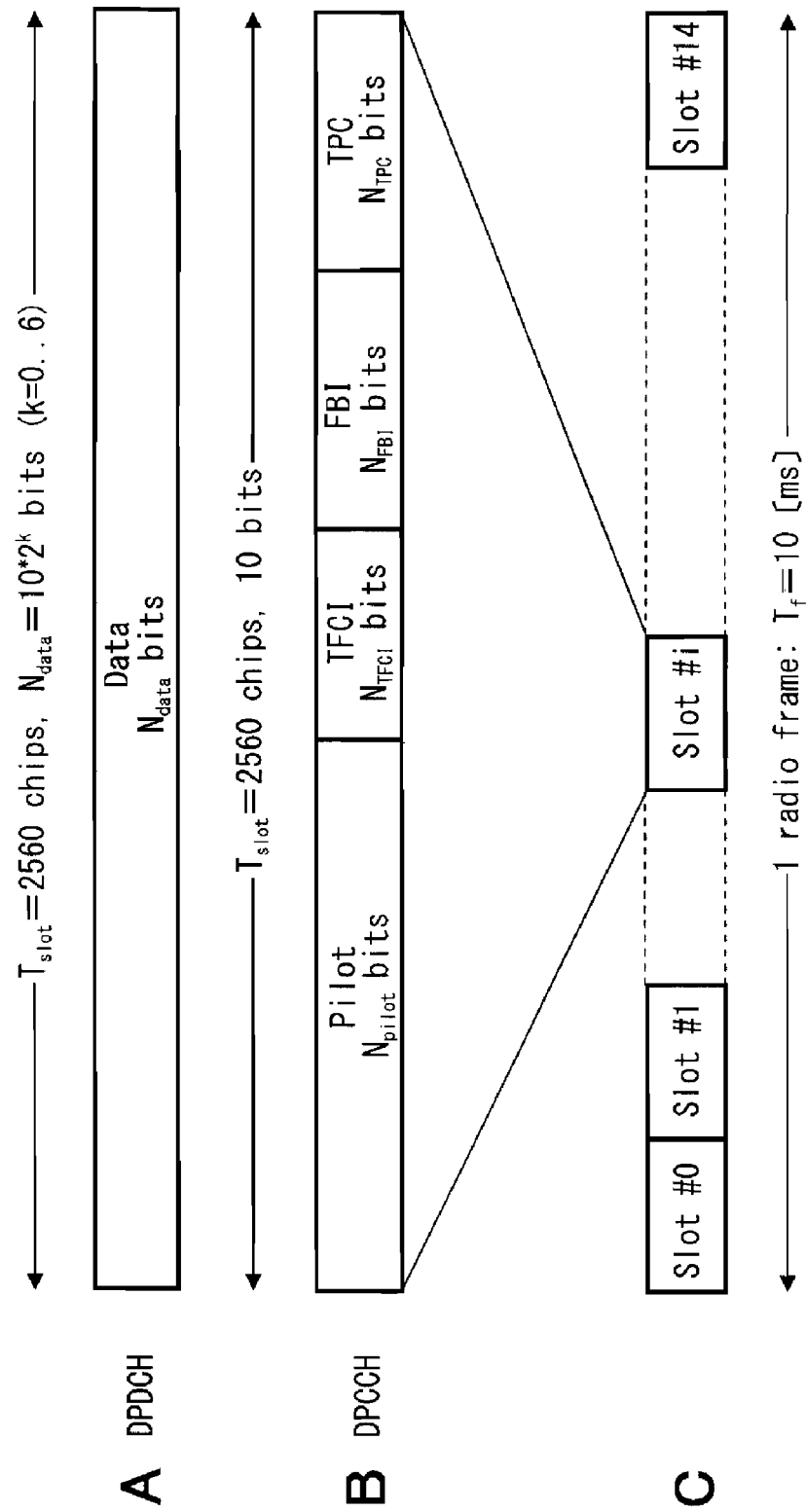
FIG. 8 depicts a bit field of a slot of an upstream signal.

A bit field of a slot of DPCCH (Dedicated Physical Control Channel) on an upstream line will be described with reference to FIG. 8. FIG. 8 depicts an example of frame structure of a physical channel on an upstream line. A depicts DPDCH (Dedicated Physical Data Channel), B depicts DPCCH and C depicts a one frame structure.

Since in data modulation, an upstream line is BPSK (Binary Phase Shift Keying) modulation and a downstream line is Quadrature Phase Shift Keying (QPSK), frame structure of a physical channel is different between the upstream line and the downstream line. The frame structure of the physical channel of the upstream line includes DPDCH, which is user information, and DPCCH, which is control information. DPDCH and DPCCH are I/Q multiplexed on an I (In-Phase) axis and a Q (Quadrature Phase) axis by spread modulation.

DPDCH is constituted of data representing user information, and the data is constituted of $N_{data}$ bits. The length of a slot is $T_{slot}$=2560 chips and $N_{data}$=10*$2^k$ bits (k=0 . . . 6).

DPCCH is constituted of Pilot, TFCI (Transport Format Combination Indicator), FBI (Feedback Information) and TPC (Transmit Power Control), which is power control information. Pilot is constituted of $N_{pilot}$ bits, TFCI is constituted of $N_{TFCI}$ bits, FBI is constituted of $N_{FBI}$ bits and TPC is constituted of $N_{TPC}$ bits. The length of a slot is $T_{slot}$=2560 chips and =10 bits.

One radio frame, which is aggregate of the slots, is constituted of fifteen slots (#0 to #14). The length of a frame of one radio frame is, one radio frame: Tf=10 [ms].

Figure 9:
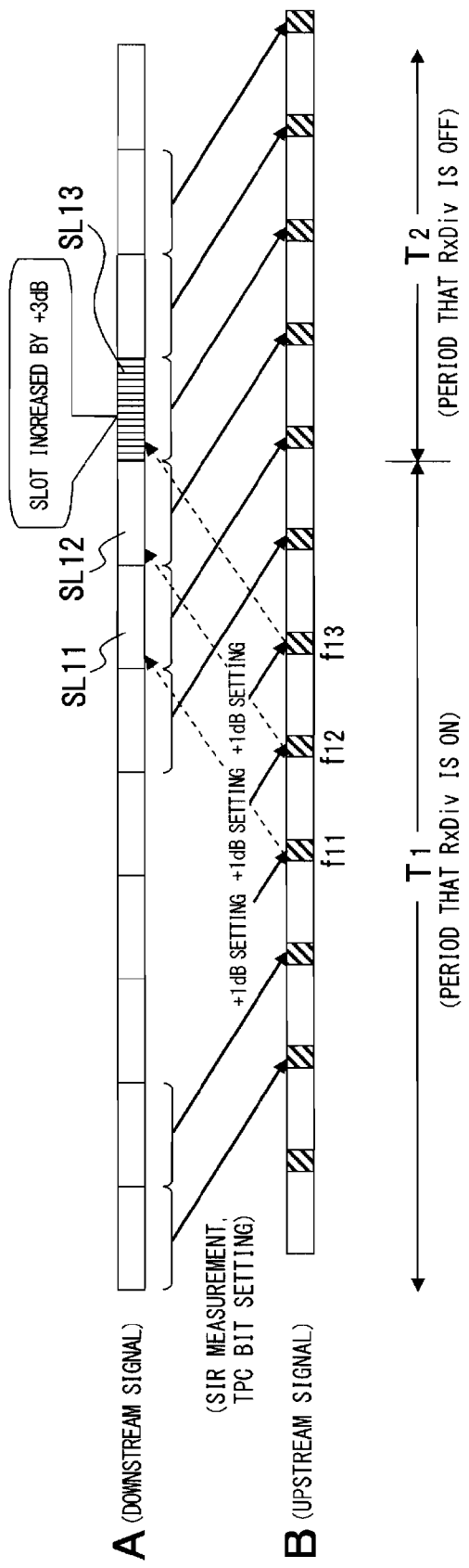
FIG. 9 depicts a power control sequence when a receive diversity state is switched from an operating state to a stopped state.

Power control of a downstream signal accompanying the switch-over of receive diversity will be described with reference to FIGS. 9 and 10. FIG. 9 depicts a power control sequence when RxDiv is from ON to OFF, and FIG. 10 depicts a power control sequence when RxDiv is from OFF to ON.

Figure 10:
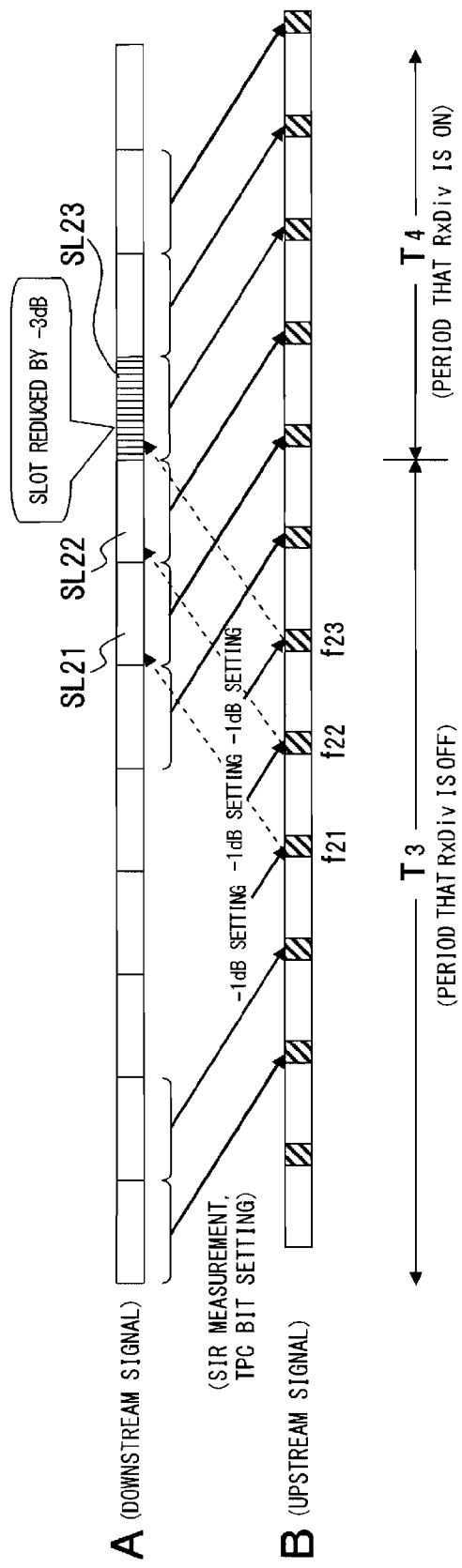
FIG. 10 depicts a power control sequence when a receive diversity state is switched from a stopped state to an operating state.

In FIGS. 9 and 10, A is a downstream signal transmitted from the base station 4 to the terminal device 6, and received by the terminal device 6. B is an upstream signal transmitted from the terminal device 6 to the base station 4, and received by the base station 4 side. In FIG. 9, $T_1$ is an ON period of receive diversity (RxDiv=ON) and $T_2$ is an OFF period of the receive diversity (RxDiv=OFF). In FIG. 10, $T_3$ is an OFF period of the receive diversity (RxDiv=OFF) and $T_4$ is an ON period of the receive diversity (RxDiv=ON)

In the terminal device 6, the TPC bit setting based on the SIR measurement of a received downstream signal is set to an upstream signal. As described above, the setting result is reflected in the downstream signal by the delay of three slots.

As depicted in FIG. 9, power control information by +1 [dB] set to the TPC bit fields of the upstream signal f11, f12 and f13 is reflected in the slots of the downstream signal SL11, SL12 and SL13. Thus, in the slot SL13, the power increase of 3 [dB] is achieved. That is, if 3 [dB] of receive gains are reduced as rapid variation in the reception characteristics at the portable device 6 side at the time point when the receive diversity state is switched to the individual antenna reception, this reduction of receive gains is supplemented by increasing the power of the downstream signal, inconvenience such as disconnection can be avoided to obtain reliable communication characteristics.

When the receive diversity is switched from OFF to ON, as depicted in FIG. 10, power control information by −1 [dB] set to the TPC bit fields of the upstream signal f21, f22 and f23 is reflected in the slots of the downstream signal SL21, SL22 and SL23. Thus, in the slot SL23, the power reduction of 3 [dB] is achieved. That is, if 3 [dB] of receive gains are enhanced as rapid variation in the reception characteristics at the portable device 6 side at the time point when the individual antenna reception is switched to the receive diversity state, this enhancement of receive gains is supplemented by reducing the power of the downstream signal, excessive reception quality and unnecessary power consumption can be avoided to obtain reliable communication characteristics.

Second Embodiment

Figure 11:
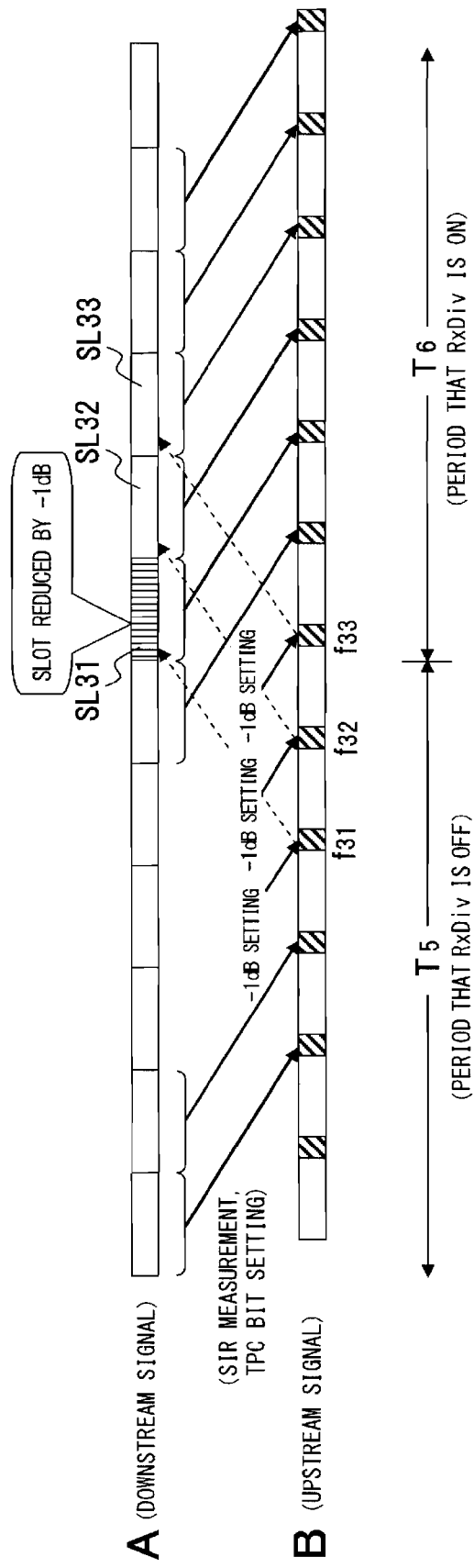
FIG. 11 depicts a power control sequence when a receive diversity state is switched from a stopped state to a operating state according to a second embodiment.

A second embodiment of the present invention will be described with reference to FIG. 11. FIG. 11 depicts a power control sequence of a downstream signal accompanying the switch-over of receive diversity. In FIG. 11, A is a downstream signal transmitted from the base station 4 to the terminal device 6 and received by the terminal device 6. B is an upstream signal transmitted from the terminal device 6 to the base station 4 and received by the base station 4 side. In FIG. 11, $T_5$ is an OFF period of the receive diversity (RxDiv=OFF) and $T_6$ is an ON period of the receive diversity (RxDiv=ON).

In the first embodiment, even if RxDiv is from OFF to ON, that is, even if a receive gain is enhanced by a receive diversity state, the transmit power of the downstream signal is reduced by 1 [dB] from three slots before the time point of the switch-over from the individual antenna reception to the receive diversity, and after completion of power control, the receive diversity is switched. In the second embodiment, it is the same as the above embodiment that power control information by −1 [dB] set to the TPC bit fields of the upstream signal f31, f32 and f33 is reflected in each slot of the downstream signal SL31, SL32 and SL33, thus in the slot SL33, the power reduction of 3 [dB] is achieved.

In this second embodiment, it may be structured that at the time point of the power reduction of 1 [dB] in the slot SL31, the switch-over from the individual antenna reception to the receive diversity is executed. In such structure, the receive gains of 3 [dB] are enhanced when the switch-over from the individual antenna reception to the receive diversity is executed. Power can be reduced only by 1 [dB] for the enhancement. Thus, excessive power consumption can be suppressed, and quality of service is not lowered.

The structure of switching a receive diversity state at the time point of the slot SL32 is available, and the same effects can be obtained.

Third Embodiment

Figure 12:
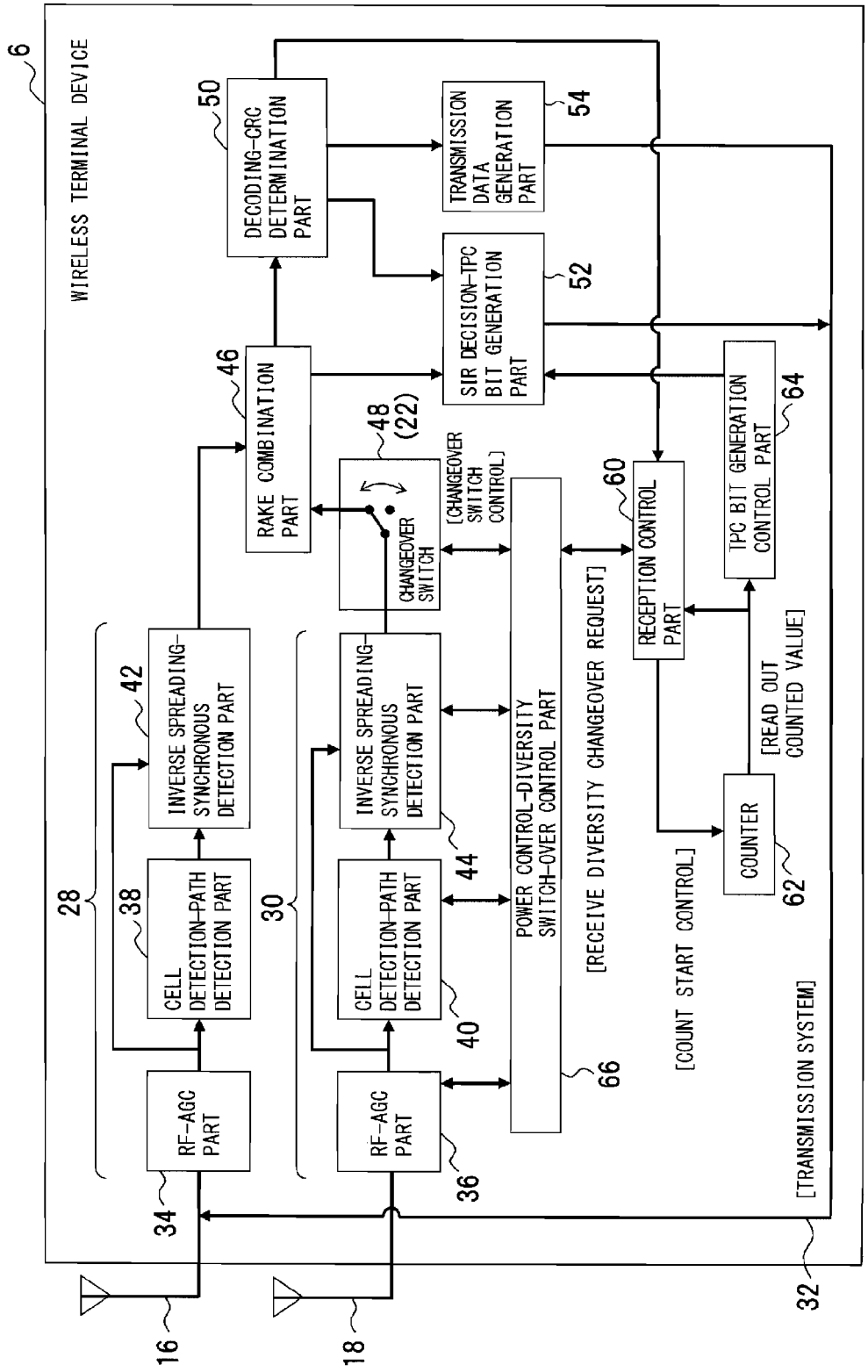
FIG. 12 depicts an example of configuration of a wireless terminal device according to a third embodiment.

A third embodiment of the present invention will be described with reference to FIG. 12. FIG. 12 depicts a transmit power control system of a base station by a wireless terminal device. In FIG. 12, the same components as described in FIG. 5 are denoted by the same reference numerals.

In this embodiment, a power control-diversity switch-over control part 66 is disposed as a diversity switch-over control part and as a power source control part of the second reception system 30. By this structure, when a diversity state is switched to individual antenna reception, the operation of the RF-AGC part 36, the cell detection-path detection part 40 and the inverse spreading-synchronous detection part 44 of the second reception system 30 are stopped.

According to such structure, power consumption of the terminal device 6 can be suppressed by stopping power feeding to the second reception system not used.

Other Embodiments

By utilizing that there are plural of reception systems, it may be configured that receive diversity is OFF dynamically, and during communication by one branch, signal strength measurement is executed by frequency different from that during communication of the first reception system 28 and the transmission system 32 by using the second reception system 30, which is another branch.

In the above embodiments, the counter 62 counts the number of slots. It may be configured that other control signals or clock signals are counted, and according to a counted value thereof, receive diversity is switched.

In the above embodiments, switching timing of receive diversity is set, a slot is counted before a predetermined time therefrom, and when a counted value thereof arrives at a predetermined value, the receive diversity is switched. The structure is available that the switching timing is option, the slot of a downstream signal is counted arbitrary, and when a counted value thereof arrives at a predetermined value, the receive diversity is switched.

Technical ideas extracted from the embodiments of the present invention described above will then be listed. The technical ideas of the present invention may be comprehended at various levels and variations ranging from higher to lower conceptions and the present invention is not limited to the following description.

A system of controlling transmit power of a base station where a terminal device having a receive diversity function is wirelessly connected includes a power information generation part to generate transmit power control information that corresponds to variation in reception characteristics of the terminal device when a receive diversity state is switched; and a transmit power control part to control transmit power of a downstream signal based on the transmit power control information. That is, the transmit power control information generated by the power information generation part is used for the power control of a base station, the transmit power of a downstream signal is controlled, the transmit power corresponding to the variation in reception characteristics of the terminal device is obtained, and deterioration of communication characteristics and excessive consumed power at a base station side can be reduced.

Preferably, the above system may include a power information addition part to add the transmit power control information to an upstream signal that is transmitted from the terminal device to a base station. In the system, preferably, the power information generation part may generate the transmit power control information to change the transmit power incrementally from a predetermined time before a time point when a receive diversity state is switched. In the system, preferably, the power information generation part may generate the transmit power control information to increase the transmit power of the downstream signal when receive diversity is switched from an operating state to a stopped state, and generate the transmit power control information to reduce the transmit power of the downstream signal when receive diversity is switched from a stopped state to an operating state.

Preferably, the above transmit power control system may include a diversity switch-over part to switch a receive diversity state of the terminal device after, correspondingly to switch-over of the receive diversity state of the terminal device, control of the transmit power of the downstream signal is started or completed.

A method of controlling transmit power of a base station where a terminal device having a receive diversity function is wirelessly connected includes generating transmit power control information to suppress variation in reception characteristics of the terminal device when a receive diversity state is switched; and controlling transmit power of a downstream signal based on the transmit power control information.

Preferably, the above method may include adding the transmit power control information to an upstream signal that is transmitted from the terminal device to a base station. In the method, preferably, the transmit power control information may be information to change the transmit power incrementally from a predetermined time before a time point when a receive diversity state is switched. Preferably, the method may include generating the transmit power control information to increase the transmit power of the downstream signal when receive diversity is switched from an operating state to a stopped state, and generating the transmit power control information to reduce the transmit power of the downstream signal when receive diversity is switched from a stopped state to an operating state. Preferably, the method may include switching a receive diversity state of the terminal device after, correspondingly to switch-over of the receive diversity state of the terminal device, control of the transmit power of the downstream signal is started or completed.

A terminal device to be wirelessly connected to a base station and to have a receive diversity function includes a power information generation part to generate transmit power control information that suppresses variation in transmit power of a downstream signal in a case of switch-over of a receive diversity state, which is generated in the terminal device.

Preferably, the above terminal device may include a power information addition part to add the transmit power control information to an upstream signal that is transmitted from the terminal device to a base station. In the terminal device, preferably, the power information generation part may generate the transmit power control information to change the transmit power incrementally from a predetermined time before a time point in the case of switch-over of a receive diversity state. In the terminal device, preferably, the power information generation part may generate the transmit power control information to increase the transmit power of the downstream signal when receive diversity is switched from an operating state to a stopped state, and generate the transmit power control information to reduce the transmit power of the downstream signal when receive diversity is switched from a stopped state to an operating state. Preferably, the terminal device may include a diversity switch-over part to switch a receive diversity state of the terminal device after, correspondingly to switch-over of the receive diversity state of the terminal device, control of the transmit power of the downstream signal is started or completed. Preferably, the terminal device may include a counter to count the number of slots including transmit power control information of the downstream signal from a predetermined time before switch-over of a receive diversity state, wherein the power information generation part generates the transmit power control information in accordance with a counted value by the counter.

According to the embodiments discussed herein, the following effects can be obtained.

(1) In response to rapid variation in reception characteristics accompanying switch-over of reception diversity, transmit power of a downstream signal of a base station can be controlled.

(2) In response to rapid deterioration in reception characteristics when reception diversity is switched from an operating state to a stopped state, transmit power of a downstream signal of a base station can be increased, and reduction of reception quality can be prevented.

(3) In response to rapid enhancement of a receive gain when reception diversity is switched from a stopped state to an operating state, transmit power of a downstream signal of a base station can be reduced, and excessive reception quality can be suppressed and vain consumption of transmit power at a base station can be prevented.

While the most preferred embodiments of the present invention have been described hereinabove, the present invention is not limited to the above embodiments, and it is a matter of course that various variations and modifications can be made by those skilled in the art within the scope of the claims without departing from the spirit of the invention disclosed herein, and needless to say, such variations and modifications are also encompassed in the scope of the present invention.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

The embodiments discussed herein can be broadly utilized for communication between a communication terminal device where a receive diversity function is mounted and a base station, or a communication satellite as abase station, thus useful.

What is claimed is:

1. A system of controlling transmit power of a base station where a terminal device having a receive diversity function is wirelessly connected, the system comprising:
   a power information generation part to generate transmit power control information that corresponds to variation in reception characteristics of the terminal device when a receive diversity state is switched; and
   a transmit power control part to control transmit power of a downstream signal based on the transmit power control information,
   wherein the power information generation part generates the transmit power control information to reduce the transmit power of the downstream signal when receive diversity is switched from a stopped state to an operating state.

2. The system of claim 1, further comprising
   a power information addition part to add the transmit power control information to an upstream signal that is transmitted from the terminal device to a base station.

3. The system of claim 1, wherein
   the power information generation part generates the transmit power control information to change the transmit power incrementally from a predetermined time before a time point when a receive diversity state is switched.

4. The system of claim 1, wherein
the power information generation part generates the transmit power control information to increase the transmit power of the downstream signal when receive diversity is switched from an operating state to a stopped state.

5. The system of claim 1, further comprising
a diversity switch-over part to switch a receive diversity state of the terminal device after, correspondingly to switch-over of the receive diversity state of the terminal device, control of the transmit power of the downstream signal is started or completed.

6. A method of controlling transmit power of a base station where a terminal device having a receive diversity function is wirelessly connected, the method comprising:
generating transmit power control information to suppress variation in reception characteristics of the terminal device when a receive diversity state is switched; and
controlling transmit power of a downstream signal based on the transmit power control information,
wherein said generating transmit power control information includes generating the transmit power control information to reduce the transmit power of the downstream signal when receive diversity is switched from a stopped state to an operating state.

7. The method of claim 6, further comprising
adding the transmit power control information to an upstream signal that is transmitted from the terminal device to a base station.

8. The method of claim 6, wherein the transmit power control information is information to change the transmit power incrementally from a predetermined time before a time point when a receive diversity state is switched.

9. The method of claim 6, further comprising
generating the transmit power control information to increase the transmit power of the downstream signal when receive diversity is switched from an operating state to a stopped state.

10. The transmit power control method of claim 6, further comprising
switching a receive diversity state of the terminal device after, correspondingly to switch-over of the receive diversity state of the terminal device, control of the transmit power of the downstream signal is started or completed.

11. A terminal device to be wirelessly connected to a base station and to have a receive diversity function, the terminal device comprising:
a power information generation part to generate transmit power control information that suppresses variation in transmit power of a downstream signal in a case of switch-over of a receive diversity state, which is generated in the terminal device,
wherein the power information generation part generates the transmit power control information to reduce the transmit power of the downstream signal when receive diversity is switched from a stopped state to an operating state.

12. The terminal device of claim 11, further comprising
a power information addition part to add the transmit power control information to an upstream signal that is transmitted from the terminal device to a base station.

13. The terminal device of claim 11, wherein
the power information generation part generates the transmit power control information to change the transmit power incrementally from a predetermined time before a time point in the case of switch-over of a receive diversity state.

14. The terminal device of claim 11, wherein
the power information generation part generates the transmit power control information to increase the transmit power of the downstream signal when receive diversity is switched from an operating state to a stopped state.

15. The terminal device of claim 11, further comprising
a diversity switch-over part to switch a receive diversity state of the terminal device after, correspondingly to switch-over of the receive diversity state of the terminal device, control of the transmit power of the downstream signal is started or completed.

16. The terminal device of claim 11, further comprising:
a counter to count the number of slots including transmit power control information of the downstream signal from a predetermined time before switch-over of a receive diversity state,
wherein the power information generation part generates the transmit power control information in accordance with a counted value by the counter.

* * * * *